May 16, 1933.  M. T. WESTON  1,909,792

VARIABLE SPEED DRIVE

Filed July 28, 1932  4 Sheets-Sheet 1

INVENTOR
Milton T. Weston

May 16, 1933.　　　M. T. WESTON　　　1,909,792
VARIABLE SPEED DRIVE
Filed July 28, 1932　　　4 Sheets-Sheet 3

INVENTOR
Milton T. Weston

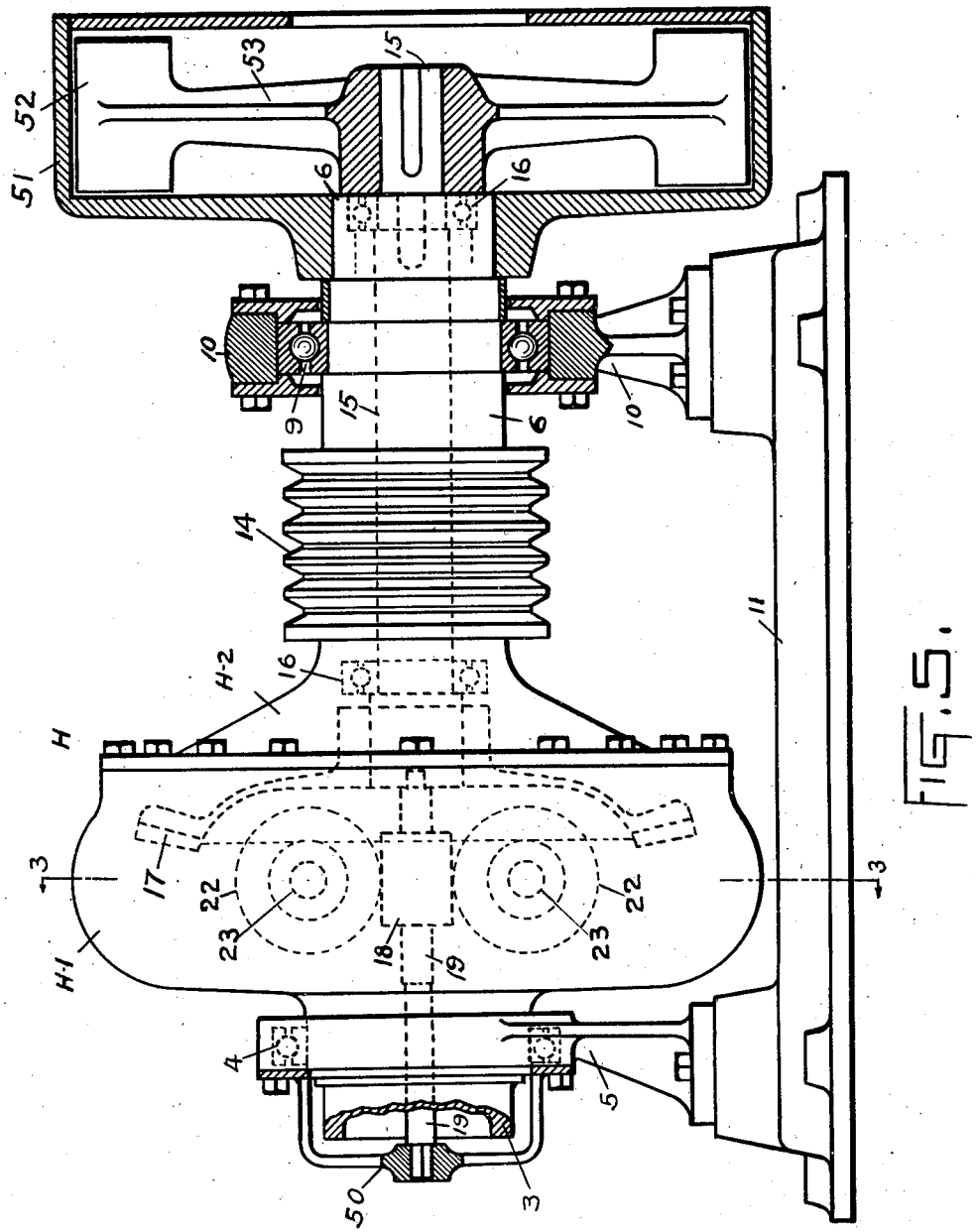

Patented May 16, 1933

1,909,792

UNITED STATES PATENT OFFICE

MILTON T. WESTON, OF NEW YORK, N. Y.

VARIABLE SPEED DRIVE

Application filed July 28, 1932. Serial No. 625,337.

My invention relates to improvements in positively geared variable speed drives, with variable speed motor control, for use either in group drives as in paper machines where separate adjustment of the speed of the several sections is necessary or in individual drives where a close regulation of the speed of the driven machine is desirable. Another important use is the driving of two different elements of the same machine at comparatively high velocities with a relatively slight differential in the speed of the two elements with respect to each other.

The principal object of my invention is to provide a device in which a relatively small portion of the power from the main source is transmitted through the variable speed gearing in the unit in order to avoid the high potential power losses and also the energy losses in the form of dissipated heat. In variable speed differential geared drives practically all of the power of the main driving motor goes through the differential gearing at relatively high speeds even when the slow speed shaft is revolving at its lowest speed. This results in very high energy losses on account of the high potential loads carried. In my invention the variable speed gearing is brought into use only for the actual variation required and the tooth speed is in direct proportion to the actual variation in speed. The tooth speed is therefore very low and there are no potential power losses, which results in very high efficiency.

The improvements in this invention have certain advantages not embodied in my Patents 1,594,394—1,594,395—1,594,396 dated Aug. 3, 1926 and 1,837,803 dated Dec. 22, 1931.

Other objects and advantages will be pointed out in the following specifications and shown in the accompanying drawings in which the same reference numerals refer to similar parts in all of the views.

Fig. 5 is a vertical longitudinal exterior view similar to Fig. 1 and is intended to illustrate a particular application of my invention.

Figure 1:
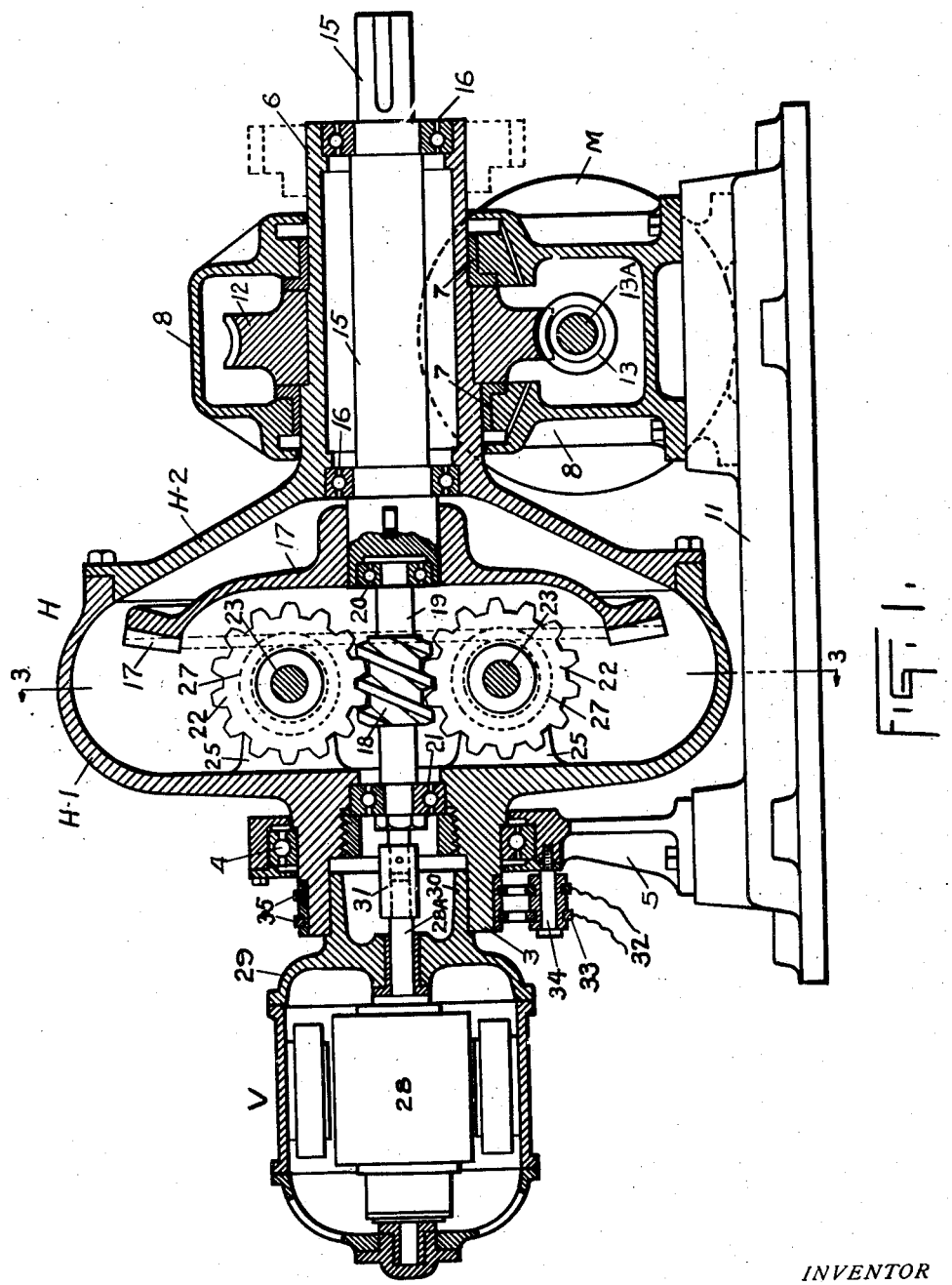
Fig. 1 shows the preferred form of my invention. The view is a vertical longitudinal section through the axis of the device.

In carrying out my invention I employ a revolvable housing H preferably composed of two parts H—1 and H—2 bolted together. Part housing H—1 has an axially extended trunnion 3 adapted to revolve in anti-friction bearing 4 mounted in pedestal 5. Part housing H—2 has an elongated sleeve-like trunnion 6 revolving in bearings 7 in speed reducer housing 8 as in Fig. 1 or in anti-friction bearing 9 mounted in pedestal 10 as in Fig. 5. The pedestal 5 and reducer housing 8, or pedestal 10, are shown mounted on base 11.

On the elongated trunnion 6, where it passes through the reducer housing 8, Fig. 1, I show a worm wheel 12 driven by a worm 13, on worm shaft 13A, mounted in housing 8 in the usual manner. The main driving motor M is preferably direct connected to the worm shaft 13A. In Fig. 5 I show a pulley 14, of the multi V-belt type, mounted on the elongated trunnion 6 by means of which it is driven.

The positively geared type of reducer shown in Fig. 1 is employed to drive the housing H where there is a relatively low output speed and in group drives where a positive synchronized speed relation between the several units of the group must be maintained as in a paper machine drive. Furthermore this type of geared drive is very efficient. In drives of relatively high speed, however, the belted type of drive shown in Fig. 5 will prove more satisfactory.

The main output or drive shaft 15 is mounted axially in the extended trunnion 6 and revolves independently in anti-friction bearings 16. One end of this drive shaft 15 extends into the revolving housing H and carries a bevel gear 17 suitably mounted thereon. The other end of drive shaft 15 projects from the extended trunnion 6 and is prepared to receive a coupling or other element of the driven part or machine.

Figure 3:
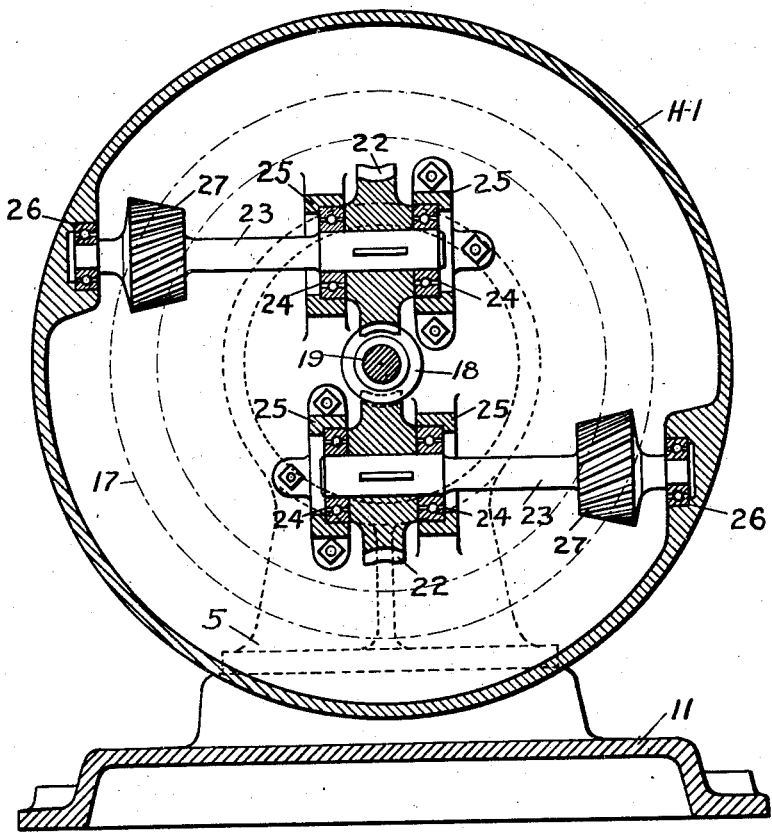
Fig. 3 is a cross sectional view taken on a line 3—3 of Figs. 1 and 5.

Mounted in the housing H in axial alignment with the drive shaft 15 is a worm 18 mounted on or integral with a worm shaft 19 which has one end revolvably mounted in anti-friction bearing 20 shown recessed in the end of drive shaft 15. The other end of the worm shaft 19 is carried by the combined radial and thrust anti-friction bearing 21 mounted in trunnion 3 of the part housing H—1 in the usual manner. Meshing with worm 18 are the two oppositely disposed worm wheels 22 on parallel shafts 23 mounted in anti-friction bearings 24 in brackets 25 on part housing H—1. I show one of each pair of brackets 25 integral with part housing H—1 and the other one of each pair bolted to part housing H—1 to facilitate assembling of the parts. The outer ends of the shafts 23 revolve in anti-friction bearings 26 carried in the outer rim of the part housing H—1. Bevel pinions 27, shown integral with the shafts 23, are located toward the outer ends of said shafts in the correct position to properly mesh with the bevel gear 17. It will be noted in the construction above described and clearly shown in Fig. 3, that the two shafts 23 are mounted in parallel relation to each other in a plane at right angles to the axis of rotation of the housing H but do not intersect the axis. This design necessitates the use of a bevel gear 17 and bevel pinions 27 of the hypoid type. The dual arrangement of the worm wheels 22, shafts 23 and bevel pinions 27, gives a balanced construction which permits relatively high speed rotation of the housing H and increases the power that can be transmitted. Furthermore, very high gear ratios can be obtained with a minimum of gear reductions.

In the preferred form of my invention shown in Fig. 1, the variable or adjustable speed control motor V revolves with the housing H and is so mounted that the axis of its armature 28 is in direct alignment with the axes of the worm 18 and drive shaft 15. The method of mounting shown is as follows. The end plate 29 has a specially constructed hub extension 30 which fits securely into the trunnion 3 of part housing H—1. Thus it will be seen that the field of the motor V positively revolves in fixed relation to the housing H. The armature 28, however, is free to revolve in either direction in the motor frame. The armature shaft 28A is positively connected to the worm shaft 19 by means of the sleeve coupling 31. Electric current is brought to the variable speed motor V by means of conductors 32 connected to brushes 33 supported by the stud 34 projecting from the pedestal 5. The brushes 33 are respectively in contact with the collector rings 35 mounted in insulation on the trunnion 3 of part housing H—1. The collector rings 35 are connected in circuit with the coils of the motor V in the usual and approved manner.

Figure 2:
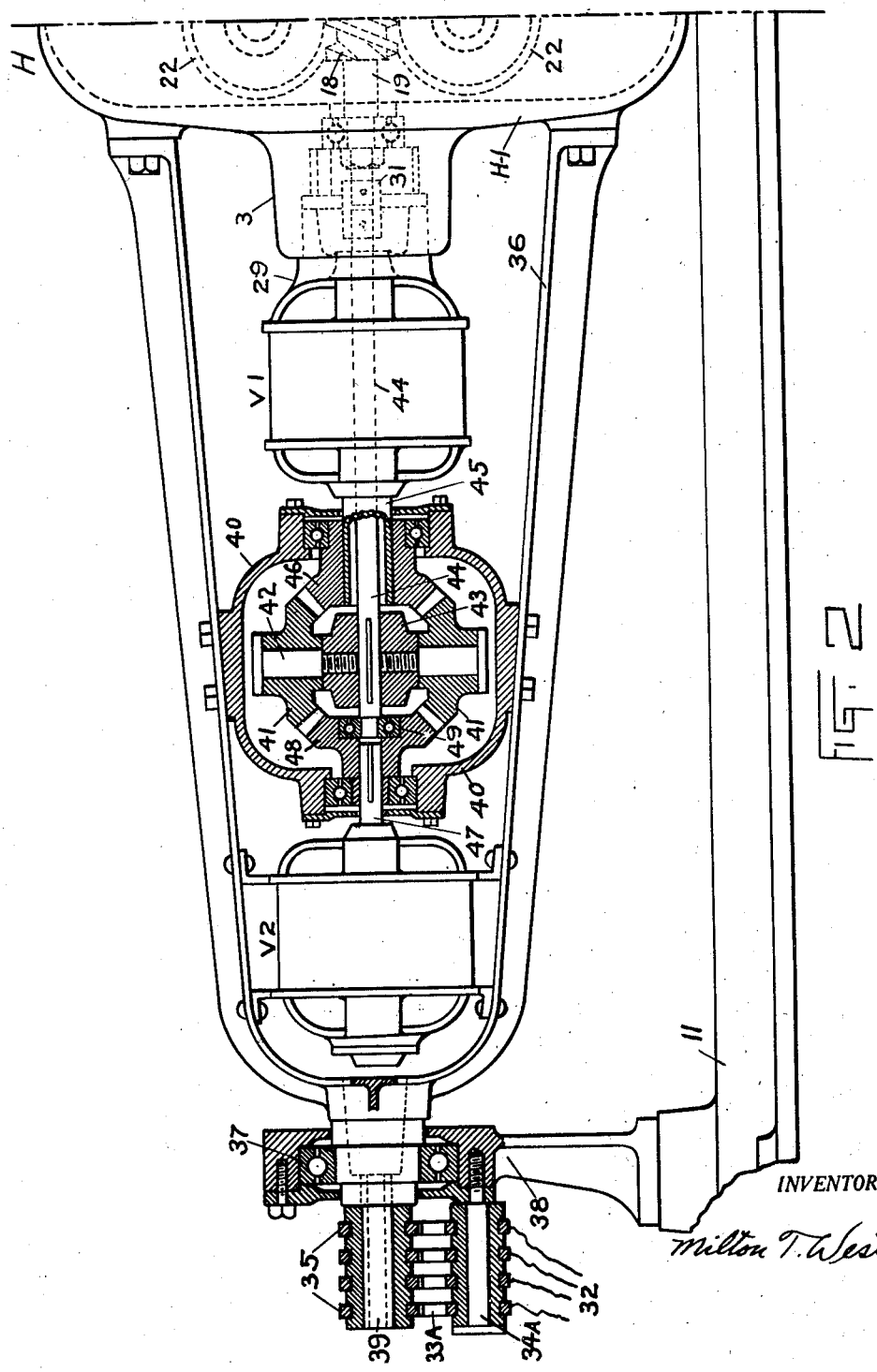
Fig. 2 is a partial view similar to Fig. 1 showing the dual motor control.

In Fig. 2 I show a dual variable speed motor control for the worm 18, which has many advantages over the single motor control in Fig. 1. In this arrangement the two variable speed motors V1 and V2 are also mounted in axial alignment with the housing H and worm 18 as in the single motor control in Fig. 1. The two motors V1 and V2 are shown mounted within a spider extension 36 bolted to or otherwise attached to the housing H. The outer end of the spider extension 36 is revolvably supported in an anti-friction bearing 37 in pedestal 38. The required number of collector rings 35 for two motors are mounted on the hollow stud 39 projecting from the end of the spider 36. The wiring for the two variable speed motors V1 and V2 is brought through the hollow stud 39 and connected to the motors in the usual manner known to anyone skilled in the art. Electric current is brought to collector rings 35 by means of the leads 32 connected to brushes 33A on stud 34A projecting from the pedestal 38. The motors V1 and V2 are oppositely disposed within the spider 36 and between them is mounted the gear case 40 also in axial alignment and attached to the spider 36. In gear case 40 is mounted a set of simple differential mitre gears in the following manner. The two oppositely disposed idler mitre gears 41 are mounted to freely revolve on studs 42 screwed into or otherwise secured in the central hub 43 which is keyed on worm shaft extension 44. The armature shaft 45 in motor V1 is hollow to allow the worm shaft extension 44 to pass independently through it. The driving end of the hollow armature shaft 45 of motor V1 extends into the gear case 40 and carries a mitre gear 46 in mesh with both idler mitre gears 41. Similarly the driving end of armature shaft 47 of motor V2 extends into the gear case 40 from the opposite side and carries a mitre gear 48 also meshing with the two idler mitre gears 41. It will be noted that one end of the worm extension shaft 44 is coupled direct with the worm shaft 19 while the opposite end extends into the gear case 40 and is revolvably mounted in anti-friction bearing 49 shown in the hub of the mitre gear 48. This mounting of the worm extension shaft 44 keeps it in perfect axial alignment with the other parts in the housing H.

The use of the dual motor control for worm 18 just described offers a very wide variety of speed variation and has two principal advantages. Any tendency of the two motors V1 and V2 to "hunt" or vary in speed may be largely neutralized by running them in opposite directions for it is clear that equal variation in the speed of the two motors while running at substantially the same speed will not effect the worm 18. For example if both motors V1 and V2 are running in opposite directions at 500 R. P. M. the worm 18 will not be effected and it will not revolve with respect to the housing or to the other gears in the housing. If both motors should "hunt" or vary 1% of their speed they would then be running 505 R. P. M. but since they are running in opposite directions the worm 18 will not be effected and will not change its zero relation to the housing or to the other gears in the housing. The variation of the speed of the worm is obtained by running one of the motors, say V1, faster than the other motor V2. The greatest variation is obtained by running both motors in same direction. The second advantage is in the case of group drives as in the driving of several sections of a paper machine. Motor V1 for each section can be individually adjusted for the proper "draw" between the corresponding sections. If it becomes desirable to take up any slack temporarily between any two sections of the paper machine the corresponding motor V2 may be used to do this without in any way disturbing the predetermined "draw" obtained by the motor V1. After the slack has been taken up the motor V2 can be returned to its normal speed.

In Fig. 5 I illustrate a particular adaptation of my invention to the problem of driving two elements of the same machine at a relatively low fixed differential speed with respect to each other while both elements are revolving at a very high rate of speed. In this view the worm 18 is fixed so as not to revolve by anchoring the worm shaft 19 in cap 50 bolted to the pedestal 5. The two elements of the driven machine are represented by the barrel or drum 51 securely mounted on the elongated trunnion 6 and by the scrapers 52 attached to or integral with the spider 53 keyed to the drive shaft 15. The scrapers 52 move at a slightly different speed with respect to the drum 51 requiring a very small amount of power. However when both drum 51 and scrapers 52 are driven at a relatively high rate of speed— say 800 to 900 R. P. M.—the problem becomes somewhat involved, in the present type of drive, on account of the high potential horse power which has to be taken care of. The usual method of driving this type of apparatus and the theory with calculations, are given by Prof. Buckingham in his treatise on "Spur Gears" first edition 1928, on pages 259 and 260. Applicant's observations of one of these machines are as follows: Actual difference in speed between drum and scrapers was 10 R. P. M. requiring only 5 horse power. The operating speed of the drum was 900 R. P. M. and of the scrapers 890 R. P. M. The gears required for this apparently simple service were 12" face, heat treated and ground and mounted in a water jacketed gear case. The actual heat dissipated in the cooling water from the jacket was equivalent to 12 horse power. A 40 horse power motor was used to drive the machine. Several hundred potential horse power was being taken care of in the manner described by Prof. Buckingham. The gears even then gave trouble and the oil had to be changed at frequent intervals.

Applicant's invention as illustrated in Fig. 5 and as previously described herein, operates under the above conditions as follows. Assuming the ratio of the fixed worm 18 and worm wheels 22 to be 15 to 1 and the ratio of the hypoid gear 17 and hypoid pinions 27 to be 6 to 1, the total ratio of the gearing in the revolvable housing H will be 90 to 1. Revolving the housing H through one complete revolution about its axis which is also the axis of the fixed worm 18, will cause the worm wheels 22 to move about their axes only 1 tooth or 1/15 of a revolution. The hypoid gear 17 will therefore move about its axis only 1/6 of 1/15 of a revolution or 1/90 of a revolution with respect to the housing but 89/90 of a revolution with respect to a fixed point. Therefore 900 R. P. M. of the housing H and drum 51 about the fixed worm 18 will cause the drive shaft 15 and scrapers 52 to make 10 R. P. M. with respect to the housing and drum but 890 R. P. M. with respect to a fixed point. At these speeds the worm wheels 22 make only 60 R. P. M. about their axes and the hypoid gear 17 only 10 R. P. M. about its axis. The oil in the housing will be carried around on account of the centrifugal action and therefore the gears will actually be moving through the oil at these extremely low speeds and consequently churning of the oil is entirely avoided. It will be seen that the housing H and drum 51 are driven directly from the main power source and as a result none of this power goes through the gearing in the housing. It is obvious, therefore, that the gearing in the housing will be called upon to transmit only the actual horse power required to take care of the differential speed of 10 R. P. M. or 5 horse power. There is, therefore, no potential load to be carried by the gearing. At the extremely low tooth speeds and in the absence of excessive oil agitation, there positively can be no energy loss in dissipated heat. My apparatus should run substantially room temperature.

The apparatus as shown in Fig. 5 can be made variable by simply equipping it with the variable speed motor V shown in Fig. 1. The speeds just described for the apparatus shown in Fig. 5 can be obtained by revolving the armature of the motor V at 900 R. P. M. in the proper direction, at which speed the driven worm 18 will appear fixed as in Fig. 5. Obviously the differential speed will then be 10 R. P. M. Other differential speeds can be obtained by simply changing the speed of the variable speed motor V.

Figure 4:
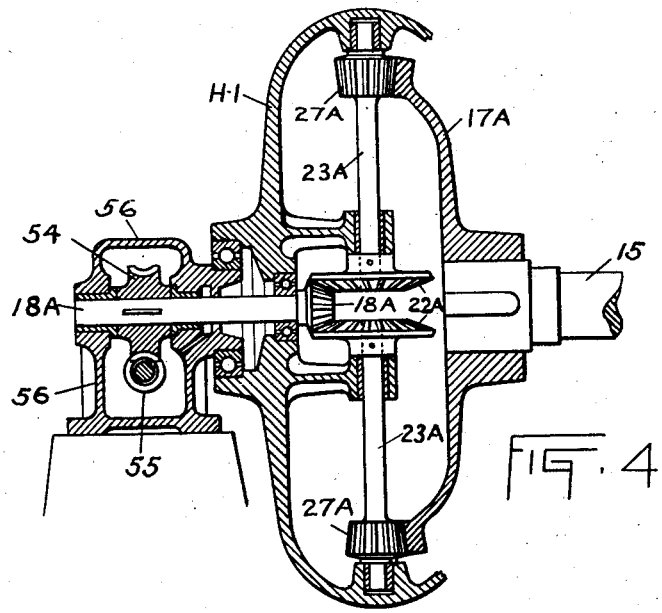
Fig. 4 is a partial longitudinal section illustrating a slightly different gear arrangement.

A modified gear arrangement giving lower ratios is shown in Fig. 4 in which a bevel pinion 18A replaces the worm 18 and two oppositely disposed bevel gears 22A are substituted for the worm wheels 22. In this construction the two shafts 23A are radial and therefore the bevel pinions 27A and the bevel gear 17A are of the regular straight or spiral type. The bevel pinion shaft 18A may be driven direct by a variable speed motor V as in Fig. 1 or by the worm wheel 54 and worm 55 mounted in a housing 56 separate from the housing H as shown.

Having thus described my invention I desire to secure by Letters Patent:

1. In a variable speed drive, the combination with two elements of a machine to be driven at different speeds, of a revolvable housing to which one of said machine elements is operably connected, a drive shaft to which the other of said machine elements is operably connected said drive shaft being axially mounted in said revolvable housing, a driving gear member axially mounted in said revolvable housing in line with said drive shaft, a positive gear train operably mounted in said revolvable housing and connecting the said drive shaft to the said driving gear member, means for driving the said revolvable housing and separate means for driving said driving gear member.

2. In a power driven mechanism, the combination with two concentric elements of a machine to be driven at different speeds, of a revolvable housing to which one of said machine elements is operable connected, a drive shaft to which the other of said machine elements is operably connected said drive shaft being concentrically mounted in said revolvable housing, a fixed gear member axially mounted in said revolvable housing in line with said drive shaft, a power-transmitting chain of positively connected elements operably connecting said drive shaft to said fixed gear member and separate means for revolving said housing about said axially mounted fixed gear member.

3. In a power driven mechanism, the combination with two concentric elements of a machine to be driven at different speeds, of a revolvable housing to which one of said machine elements is direct connected, a drive shaft to which the other of said machine elements is direct connected said drive shaft being concentrically mounted in said revolvable housing, a non-rotating driving gear member axially mounted in said revolvable housing in line with said drive shaft, means for revolving said housing about the axis of said non-rotating gear member, and a positively connected train of gear elements operably connecting said axially mounted drive shaft to said axially mounted non-rotating driving gear member.

4. In a variable speed drive, a housing revolvable in fixed bearings, means connected to said housing to impart a rotary movement to same, a drive shaft axially mounted in said housing and capable of independent rotation about its axis, a variable speed motor mounted in axial alignment with said housing and revolving with same and means, including a gear train, for connecting said axially mounted drive shaft to the armature of said variable speed motor.

5. In a variable speed drive, a revolvable housing mounted in fixed bearings, means for revolving said housing, a drive shaft axially mounted in said housing and capable of independent rotation about its axis, a variable speed motor mounted in axial alignment with said housing and adapted to revolve with same and positively geared means in said housing connecting said drive shaft to said variable speed motor.

6. In a variable speed drive, a revolvable housing mounted in fixed bearings, means to revolve said housing, a variable speed motor having its frame securely fixed to said revolvable housing in axial alignment therewith, a drive shaft mounted axially in said revolvable housing and capable of independent rotation about its axis, a gear member mounted axially in said revolvable housing and positively connected to the armature of the said variable speed motor and positive geared means in said housing operably connecting said axially mounted gear member to said axially mounted drive shaft.

7. In a variable speed drive, the combination with a revolvable housing and means for driving same, of a variable speed motor mounted in axial alignment with said housing and revolving in fixed relation thereto, a drive shaft mounted in said housing in axial alignment therewith and capable of independent rotation and a positive gear train connecting said variable speed motor to said drive shaft, said gear train comprising an axially mounted gear member independently driven by said variable speed motor, oppositely disposed gear members engaging said axially mounted gear members, shafts mounted in a plane at right angles to the axis of said housing and carrying said oppositely disposed gear members, pinions mounted on said shafts and a gear member mounted on said first mentioned drive shaft and engaging said pinions.

8. In a variable speed drive, the combination with a revolvable housing and means for driving same, of a variable speed motor mounted in axial alignment with said housing and revolving in fixed relation thereto, a drive shaft mounted in said housing in axial alignment therewith and capable of independent rotation about its axis and positive means operably connecting said variable speed motor to said drive shaft, said positive means comprising an axially mounted gear member driven by said variable speed motor, oppositely disposed gear members engaging said driven gear member, shafts on which said oppositely disposed gear members are mounted said shafts being mounted in parallel relation to each other in a plane at right angles to the axis of the housing and offsets in this plane on either side of the axis of the housing, driving pinions on said shafts and a gear member on the first mentioned drive shaft engaging said driving pinions.

9. In a power driven mechanism, the combination with two elements of a machine to be driven at varying speeds, of a revolvable housing to which one of the machine elements is connected and means for revolving said housing, a drive shaft axially mounted in said housing to which the other of the machine elements is connected, a variable speed motive power unit axially mounted to revolve in fixed relation to said housing, and a power-transmitting chain of positively connected elements operably connecting said variable speed motive power unit to said drive shaft.

10. In a power driven mechanism, the combination with two elements of a machine to be driven at different speeds, of a revolvable housing member to which one of said machine elements is connected, means to drive said revolvable housing member, an independently driven shaft axially mounted in said revolvable housing member to which the other of the machine elements is connected and a power-transmitting chain of positively connected elements mounted within said revolvable housing member, one of said positively connected elements being attached to said independently driven shaft and another of said positively connected elements being held against rotation.

11. In a power driven mechanism, a housing and means for revolving same, a drive shaft capable of independent rotation mounted axially in said housing, a driving gear member mounted axially in said housing, a gear train connecting said drive shaft and said driving gear member and a plural co-acting motive power unit operating said driving gear through a revolving differential gear train.

12. In a power driven mechanism, a housing and means for revolving same, a drive shaft capable of independent rotation mounted axially in said housing, a driving gear member axially mounted in said housing in line with said drive shaft, a gear train connecting said drive shaft to said driving gear member and a plural co-acting variable speed motive power unit revolving in fixed relation to said housing and operating the said driven gear member through differential gears revolving in fixed relation to said plural motive power unit.

Signed at New York city in the county of New York and State of New York this 25th day of July A. D. 1932.

MILTON T. WESTON.